(12) United States Patent
Nakamura et al.

(10) Patent No.: US 6,279,995 B1
(45) Date of Patent: Aug. 28, 2001

(54) RECLINING DEVICE FOR SEAT

(75) Inventors: Takeshi Nakamura; Osamu Ohki, both of Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/442,342

(22) Filed: Nov. 17, 1999

(30) Foreign Application Priority Data

Nov. 20, 1998 (JP) ................................................ 10-330728

(51) Int. Cl.[7] ........................................................ B60N 2/22
(52) U.S. Cl. .............................. 297/362.12; 297/362.14; 297/374
(58) Field of Search ............................ 297/361.1, 362.12, 297/362.14, 374

(56) References Cited

U.S. PATENT DOCUMENTS

| | | | |
|---|---|---|---|
| 4,685,735 | * 8/1987 | McFalls et al. ................. | 297/362.14 |
| 4,880,084 | * 11/1989 | Tanaka et al. ................... | 297/374 X |
| 5,295,730 | * 3/1994 | Rees ................................. | 297/361.1 |
| 5,778,733 | 7/1998 | Stringer . | |
| 5,997,089 | * 12/1999 | Kawasaki ........................ | 297/362.14 |

\* cited by examiner

*Primary Examiner*—Anthony D. Barfield
(74) *Attorney, Agent, or Firm*—Frishauf, Holtz, Goodman, Langer & Chick, P.C.

(57) ABSTRACT

A reclining device comprises a housing fixed to a seat cushion of a seat, a shaft connected to a seat back, and a locking member. A helical thread groove is formed in the outer peripheral surface of the shaft. The locking member has thread ridges that can engage the shaft. The locking member is movable between a lock position in which the thread ridges engage the thread groove of the shaft and an unlock position in which the thread ridges are disengaged from the thread groove of the shaft. The locking member is held in the lock position by means of a cam member that is urged toward a first position by means of a spring. The locking member can be moved to the unlock position when the cam member is moved to a second position.

6 Claims, 8 Drawing Sheets

RECLINING DEVICE FOR SEAT

BACKGROUND OF THE INVENTION

The present invention relates to a reclining device applied to a seat of a vehicle, such as an automobile, or of a piece of furniture, and more particularly to an improvement of locking means of the reclining device.

A seat of an automobile or the like is provided with a reclining device for adjusting the in clination of seat back. There are various types of conventional reclining devices. Described in U.S. Pat. No. 5,778,733 is one such reclining device that uses a linear mechanical lock system, combining a lead screw and a nut.

The reclining device using the linear mechanical lock system comprises a housing fixed to a seat cushion of a seat or the like, the lead screw connected to a seat back of the seat, etc. Further, the nut is rotatably stored in the housing. The nut is in mesh with the lead screw. In this prior art example, the nut is unlocked in changing the angle (reclining angle) of the seat back. If the inclination of the seat back is changed in this unlock state, the lead screw moves in its axial direction with the change of the seat back angle, and the nut rotates in the housing. The seat back can be locked by locking the nut after adjusting the reclining angle.

In the prior art example, the lead angle of the lead screw must be made wider than that of an ordinary screw, in order to allow the nut to rotate as the lead screw moves in the axial direction after the nut is unlocked. In order to reduce the resistance of rolling friction of the nut on the lead screw, moreover, a bearing member should be interposed between the housing and the nut. Further, a lock system is needed to stop the rotation of the nut. In consequence, the conventional reclining device has a complicated construction and requires use of a lot of components, thus entailing an increase in cost.

BRIEF SUMMARY OF THE INVENTION

Accordingly, the object of the present invention is to provide a reclining device having a simple construction and requiring use of fewer components and therefore lower cost.

In order to achieve the above object, according to the present invention, there is provided a reclining device for fixing a seat back of a seat at a desired angle, comprising: a housing fixed to a seat cushion of the seat or the seat back; a shaft connected to the seat back or the seat cushion and formed having a plurality of recesses extending in the circumferential direction thereof and arranged in the axial direction thereof; a locking member having projections capable of individually engaging the recesses of the shaft and movable between a lock position in which the projections engage the recesses and an unlock position in which the projections are disengaged from the recesses; a cam member capable of reciprocating between a first position in which the cam member keeps the locking member in the lock position and a second position in which the cam member moves the locking member toward the unlock position; urging means for urging the locking member toward the lock position; and an operating member capable of moving the cam member to the second position.

In the reclining device of the invention constructed in this manner, the locking member moves to the unlock position when the cam member is moved to the second position by means of the operating member. As this is done, the projections of the locking member are disengaged from the recesses of the shaft. Thereupon, the shaft and the locking member are disengaged from each other. Thus, the shaft is allowed to move with respect to the housing, so that the angle (reclining angle) of the seat back can be adjusted.

If the operating force on the operating member is removed after the angle of the seat back is adjusted, the cam member is restored to the first position, and the locking member returns to the lock position. As the projections of the locking member engage the recesses of the shaft in this manner, the shaft is fixed to the housing.

According to the invention, there may be provided a high-strength linear mechanical lock, which can securely lock the seat back despite its simple construction and fewer components. In the reclining device of the invention, the recesses are arranged in the circumferential of the shaft. If a load acts on the shaft to twist it, therefore, the device cannot be disengaged. Further, the engagement between the recesses of the shaft and the projections of the locking member ensures reliable locking, so that there is no possibility of slippage between the shaft and the locking member.

Preferably, according to the invention, the recesses of the shaft constitute a helical thread groove in the outer peripheral surface of the shaft, and the projections of the locking member are thread ridges arranged at pitches corresponding to the thread groove. With the thread groove of the shaft and the thread ridges of the locking member thus engaged with one another, shearing strength between thread groove and the thread ridges can be a maximum strength of this device when the shaft and the locking member are locked. In designing the reclining device, therefore, the maximum strength of the device can be set with ease, thus ensuring efficient designing.

Preferably, moreover, the cam member is rockable around a pivot on the housing, and the locking member has a cam receiving face, adapted to come into contact with the cam member to hold the locking member in the lock position when the cam member is rocked to the first position, and an engaging portion, adapted to come into contact with the cam member to move the locking member to the unlock position when the cam member is rocked to the second position.

Preferably, furthermore, the locking member is composed of a pair of split nut pieces situated on either side of the shaft and rockable toward or away from each other, and the cam member includes frame portions, adapted to restrict the split nut pieces lest the nut pieces separate from each other when closed, and a wedge portion, adapted to wedge into the gap between the nut pieces to separate the same when the cam member is rocked from the first position to the second position.

Preferably, moreover, the cam member can reciprocate in the axial direction of the shaft with respect to the housing, and the locking member is movable in the diametrical direction of the shaft and includes a cam receiving face, adapted to be pressed by the cam member to hold the locking member in the lock position when the cam member is in the first position, and an engaging portion, adapted to come into contact with the cam member to move the locking member to the unlock position when the cam member is moved to the second position. With this arrangement, a high-strength linear mechanical lock can be obtained that has a simple construction and requires use of fewer components, thus ensuring lower cost and reduced weight.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to the accompanying drawings of FIGS. 1 to 5.

Figure 2:
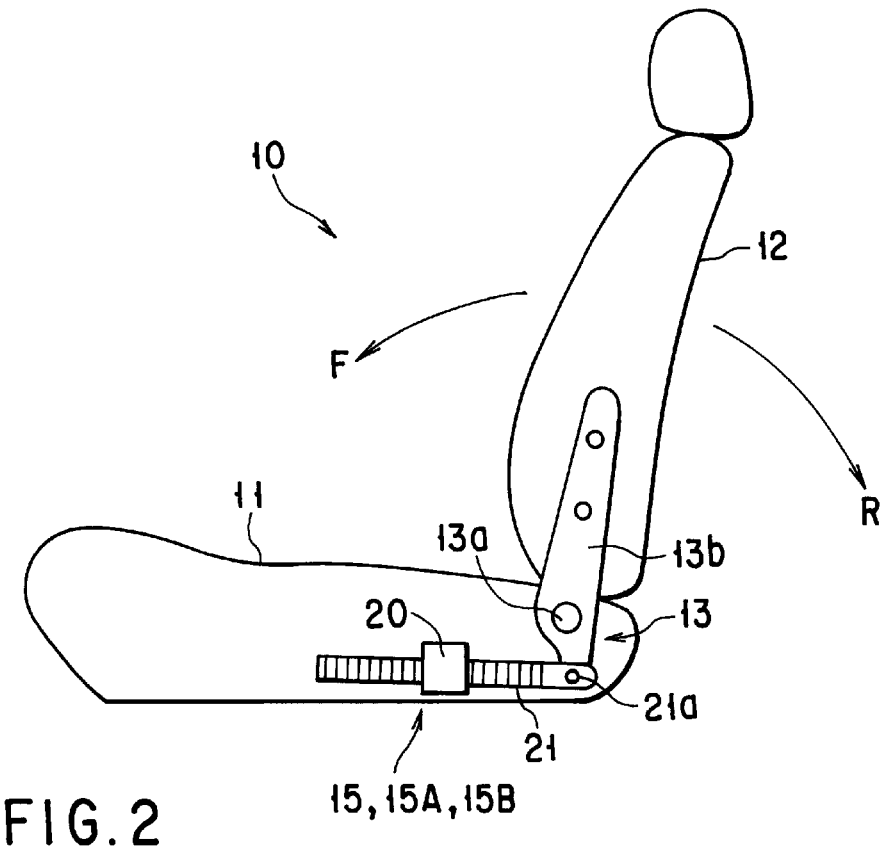
FIG. 2 is a side view of a seat furnished with the reclining device shown in FIG. 1.

As shown in FIG. 2, a vehicular seat 10 to be mounted in an automobile or the like comprises a seat cushion 11 and a seat back 12. The seat back 12 can rock forward and rearward (in the directions of arrows F and R) around a pivot 13a of a hinge 13. A movable bracket 13b of the hinge 13 is fixed to the frame of the seat back 12. The seat back 12 can be fixed at a desired tilt angle (reclining angle) by means of a reclining device 15 according to the present invention.

Figure 1:
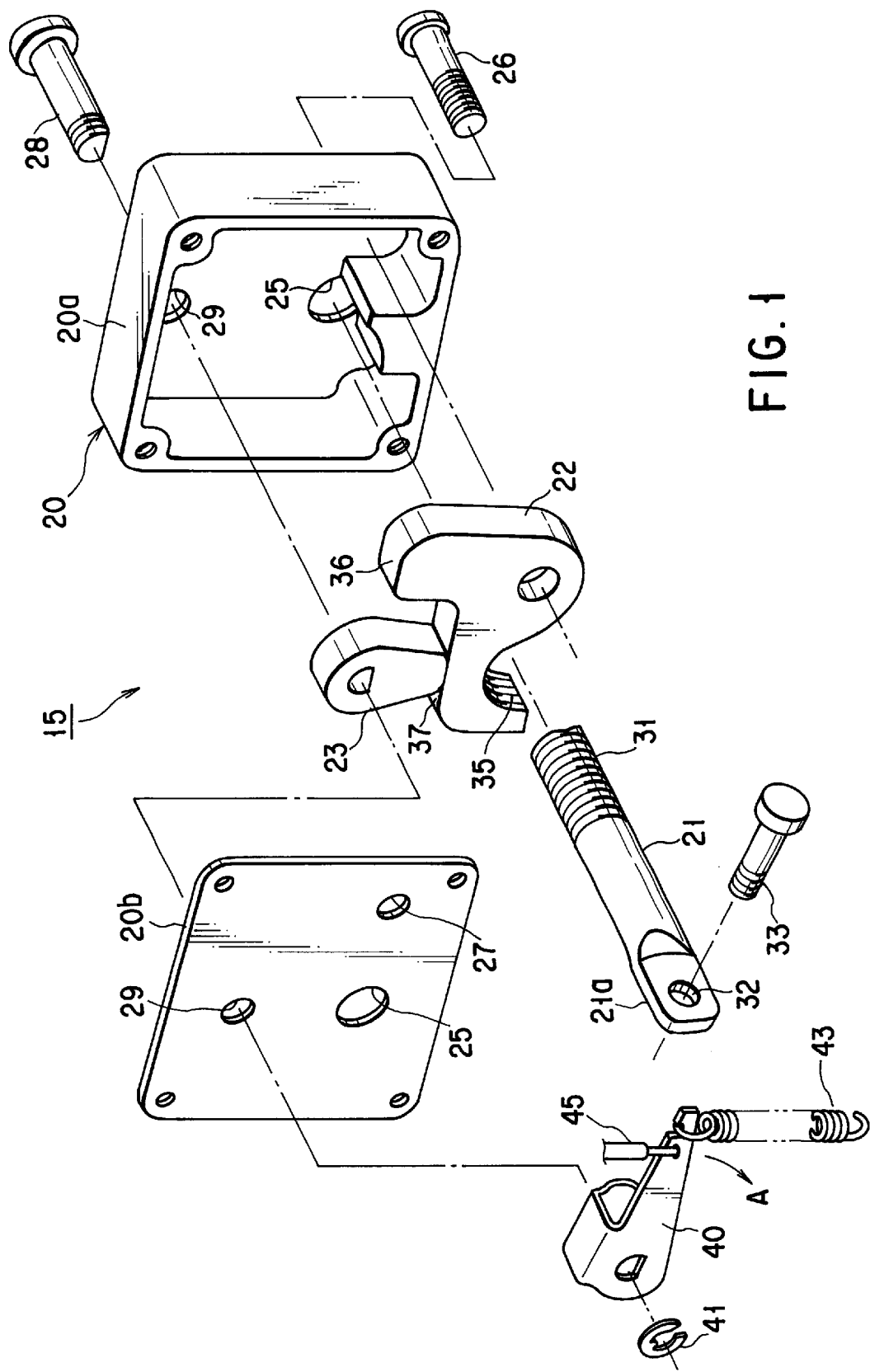
FIG. 1 is an exploded perspective view showing a part of a reclining device according to a first embodiment of the present invention.

The reclining device 15 comprises a housing 20 fixed to the frame of the seat cushion 11 or the like and a shaft 21 connected to the bracket 13b of the seat back 12. As shown in FIG. 1 and other drawings, the housing 20 contains a locking member 22 and ia cam member 23 therein. The housing 20 includes a housing body 20a, in the form of a box having an opening on one side, and a lid 20b that closes the opening of the body 20a. The housing body 20a and the lid 20b is formed each having a hole 25 through which the shaft 21 is passed, a hole 27 through which a pivot 26 of the locking member 22 is passed, a hole 29 through which a pivot 28 of the cam member 23 is passed, etc.

Figure 3:
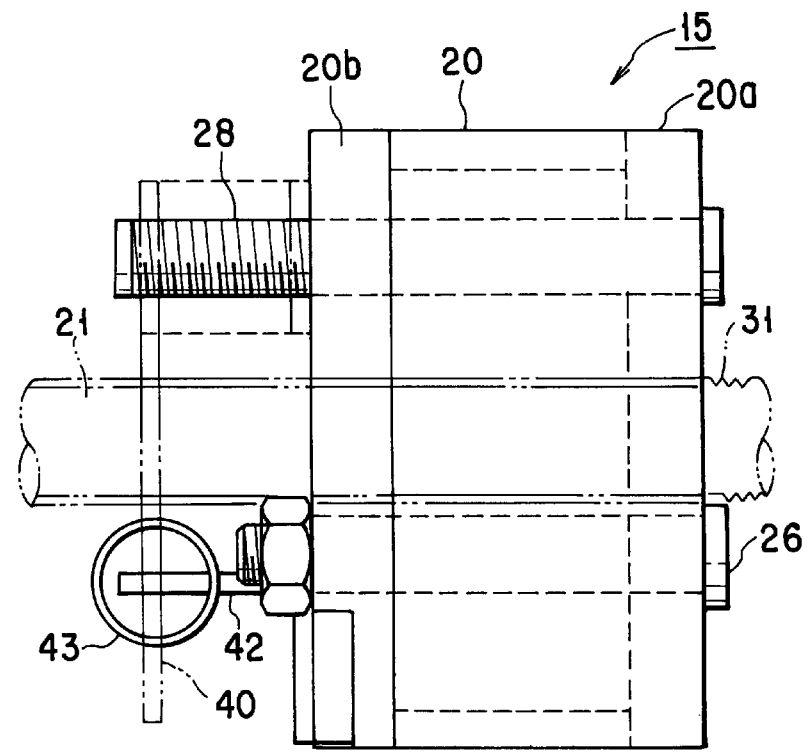
FIG. 3 is a plan view of the reclining device of FIG. 1.
Figure 13:
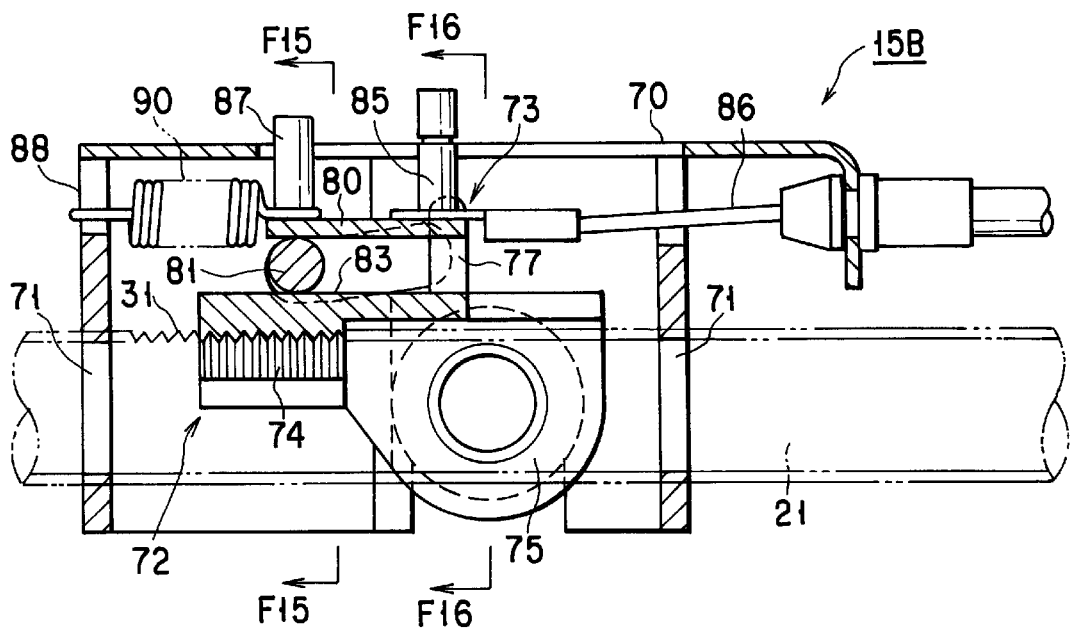
FIG. 13 is a sectional view of the reclining device of FIG. 12 in a lock state.
Figure 14:
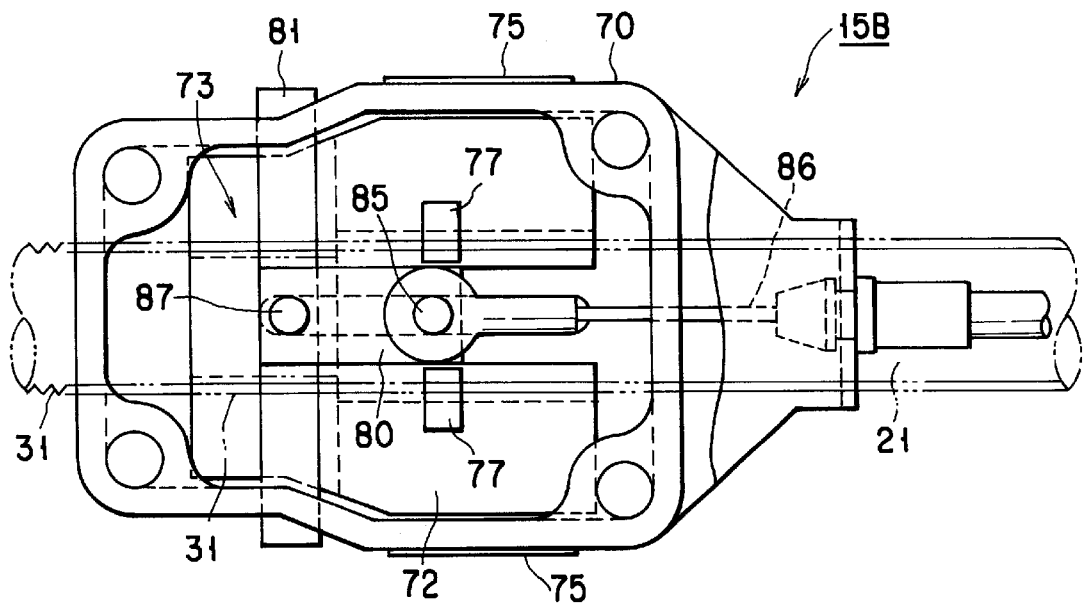
FIG. 14 is a plan view of the interior of the reclining device of FIG. 12.
Figure 15:
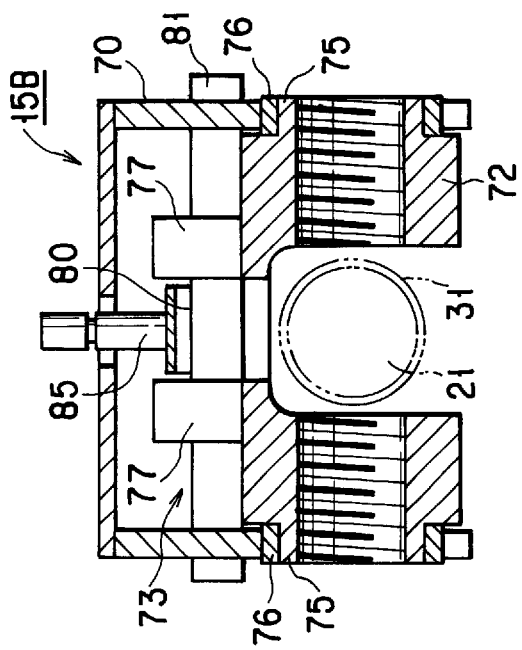
FIG. 15 is a sectional view taken along line F15—F15 of FIG. 13.
Figure 16:
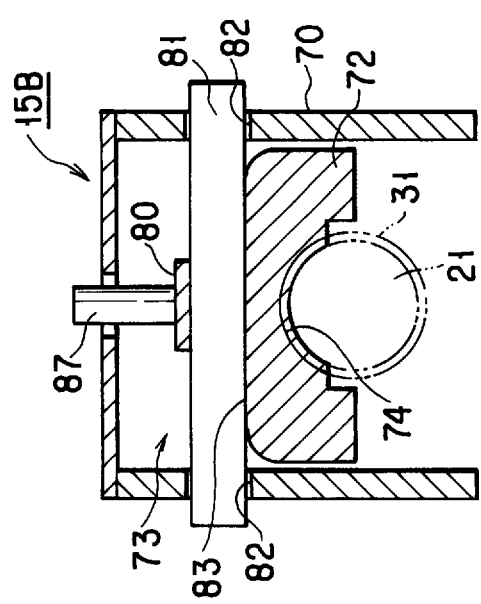
FIG. 16 is a sectional view taken along line F16—F16 of FIG. 13.

An example of the shaft 21 is in the form of an elongate bolt having a circular cross section. A helical screw thread and a thread groove 31, which serves as an example of a recess, are formed in the outer peripheral surface of shaft 21. In other words, the shaft 21 is formed having a plurality of recesses in its axial direction. These recesses separately extend in the peripheral direction of the shaft 21. In FIGS. 3, 13, 14, etc., the top of the thread of the shaft 21 and the bottom of the thread groove 31 are represented individually by two-dot chain lines for simplicity of illustration. A hole 32 is formed in one end portion 21a of the shaft 21. The shaft 21 is connected to the lower part of the bracket 13b (shown in FIG. 2) by means of a connecting member 33 such as a pin that is passed through the hole 32.

The locking member 22 in the housing 20 is provided with thread ridges 35 having pitches and flank angle corresponding to the thread groove 31 of the shaft 21, an engaging portion 36 extending in the diametrical direction of the shaft 21, a cam receiving face 37 for engagement with the cam member 23, etc. The flank is a slope that connects the top of each thread ridge and the bottom of the thread groove. Thus, the flank angle is an angle formed between the slope and a segment perpendicular to the axis of the shaft 21.

The thread ridges 35, which serve as typical projections, are arranged at pitches corresponding to the thread groove 31 of the shaft 21. Thus, the thread ridges 35 of the locking member 22 can engage the thread groove 31 of the shaft 21. The locking member 22, which is rockable around the pivot 26, can reciprocate between a lock position (shown in FIG. 4) in which it engages the shaft 21 and an unlock position (shown in FIG. 5) in which it is disengaged from the shaft 21.

The cam member 23 is located adjacent to the locking member 22. It can reciprocate integrally with and around the pivot 28 between first and second positions, which will be mentioned later. An arm 40 is fixed to an end portion of the pivot 28. It is prevented from slipping off the pivot 28 by means of a snap ring 41.

The arm 40 rocks integrally with the cam member 23. Thus, the cam member 23 can reciprocate between a first position (shown in FIG. 4) in which it keeps the locking member 22 in the lock position and a second position (shown in FIG. 5) in which it moves the locking member 22 to the unlock position.

A tension spring 43 for use as urging means is stretched under initial tension between the distal end portion of the arm 40 and a spring holder 42 of the housing 20. The spring 43 urges the arm 40 in the direction indicated by arrow A in FIG. 1, that is, toward the first position. In this first position, the cam member 23 abuts against the locking member 22 in a direction such that it presses the cam receiving face 37. Thus, the thread ridges 35 of the locking member 22 engage the thread groove 31 of the shaft 21, thereby establishing the lock state (FIG. 4).

The arm 40 or the pivot 28 is provided with an operating member 45, which can rock the cam member 23 to the second position. The operating member 45 may be a power transmission member, such as a cable or rod as illustrated, or a lever with which the cam member 23 can be rocked directly by hand.

The following is a description of the operation of the reclining device 15 (FIGS. 1 to 5) constructed in this manner.

Figure 4:
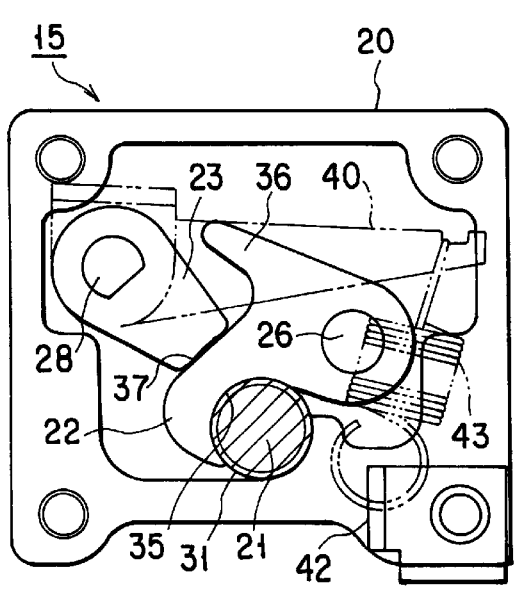
FIG. 4 is a front view of the interior of the reclining device of FIG. 1 in a lock state.

When the operating member 45 is not actuated, the arm 40 and the cam member 23 are urged toward the first position shown in FIG. 4 by means of the elastic force of the spring 43. Thus, the locking member 22 is held in the lock position. In this lock position, the thread ridges 35 of the locking member 22 engage the thread groove 31 of the shaft 21, so that the shaft 21 is fixed to the housing 20, whereupon the seat back 12 is fixed.

Figure 5:
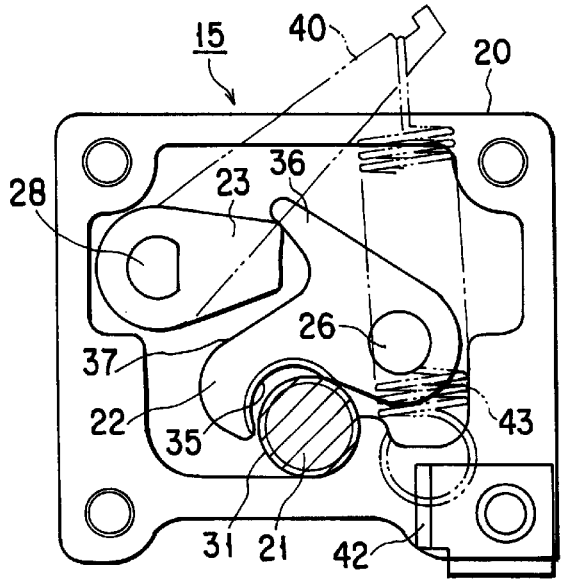
FIG. 5 is a front view of the interior of the reclining device of FIG. 1 in an unlock state.
Figure 6:
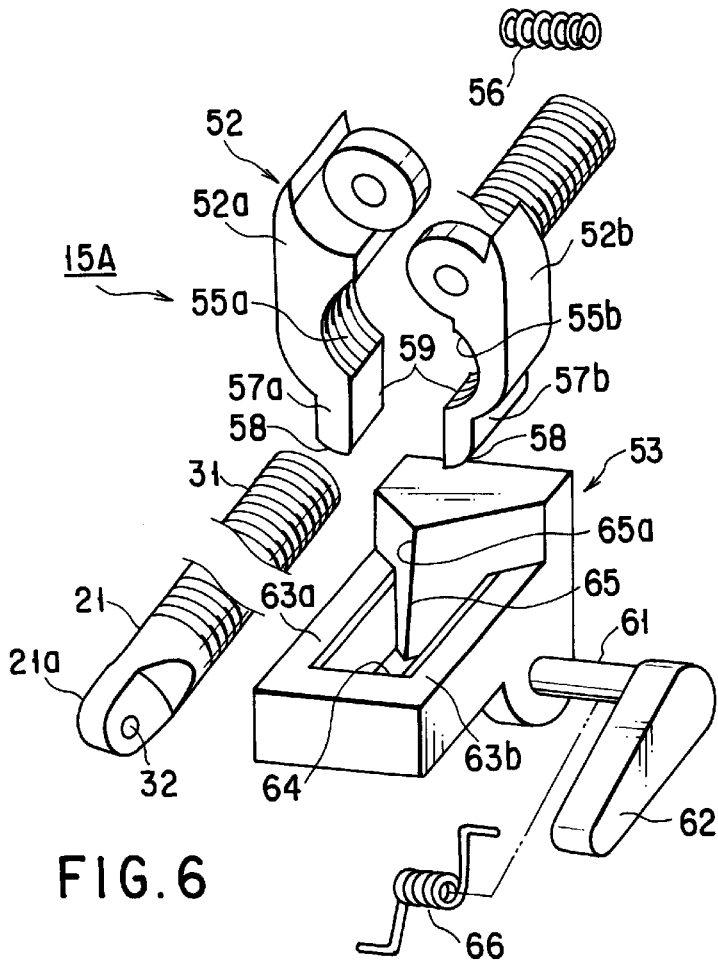
FIG. 6 is an exploded perspective view showing a part of a reclining device according to a second embodiment of the invention.

When the arm 40 and the cam member 23 are rocked to the second position shown in FIG. 5 by means of the operating member 45, the cam member 23 abuts against the engaging portion 36 of the locking member 22. Thereupon, the locking member 22 and the thread ridges 35 rocks away from the thread groove 31 of the shaft 21, so that the position is shifted to the unlock position. Thus, the locking member 22 is disengaged from the shaft 21. In consequence, the shaft 21 is allowed to move in its axial direction with respect to the housing 20, so that the angle (reclining angle) of the seat back 12 can be adjusted.

If the operating force on the operating member 45 is removed after the angle of the seat back 12 is adjusted, the arm 40 and the cam member 23 are restored to the first position shown in FIG. 4 by means of the elastic force of the spring 43. Thereupon, the thread ridges 35 of the locking member 22 engage the thread groove 31 of the shaft 21. Accordingly, the shaft 21 is fixed to the housing 20, so that the seat back 12 is fixed at a desired reclining angle. According to this embodiment, the cam member 23 can restrain the locking member 22 from moving to be disengaged, depending on the flank angle of the thread groove 31 and the thread ridges 35, when an axial force acts on the shaft 21.

A second embodiment of the present invention will now be described with reference to FIGS. 6 to 11.

Figure 8:
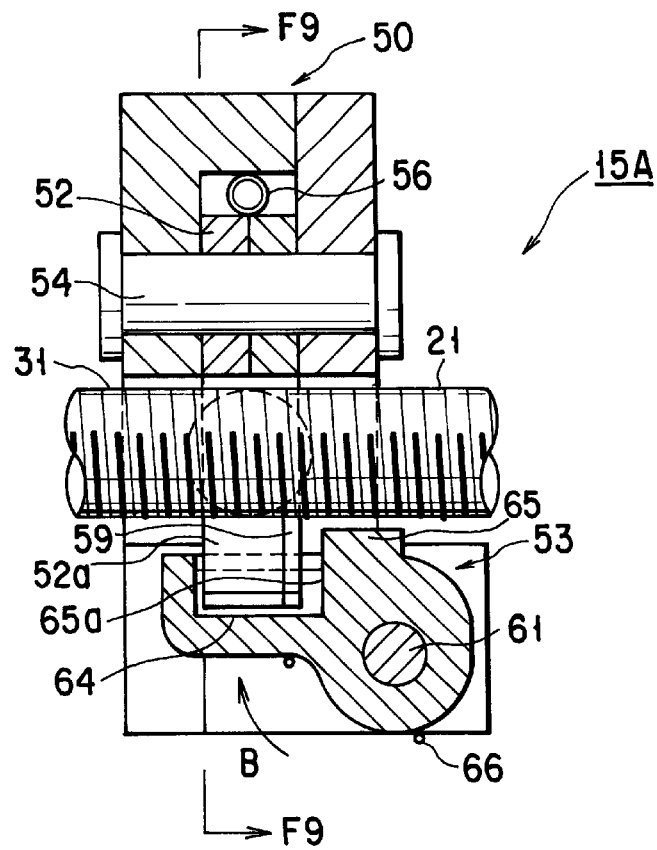
FIG. 8 is a vertical sectional view of the reclining device of FIG. 6 in a lock state.

A reclining device 15A according to this embodiment comprises a housing 50 shown in FIG. 8 and other drawings, a shaft 21 constructed in the same manner as the one according to the first embodiment, etc. An end portion 21a of the shaft 21, like the one according to the foregoing embodiment (shown in FIG. 2), is connected to the lower part of the bracket 13b of the seat back 12. The housing 50 is fixed to the frame of the seat cushion 11 or the like.

Figure 9:
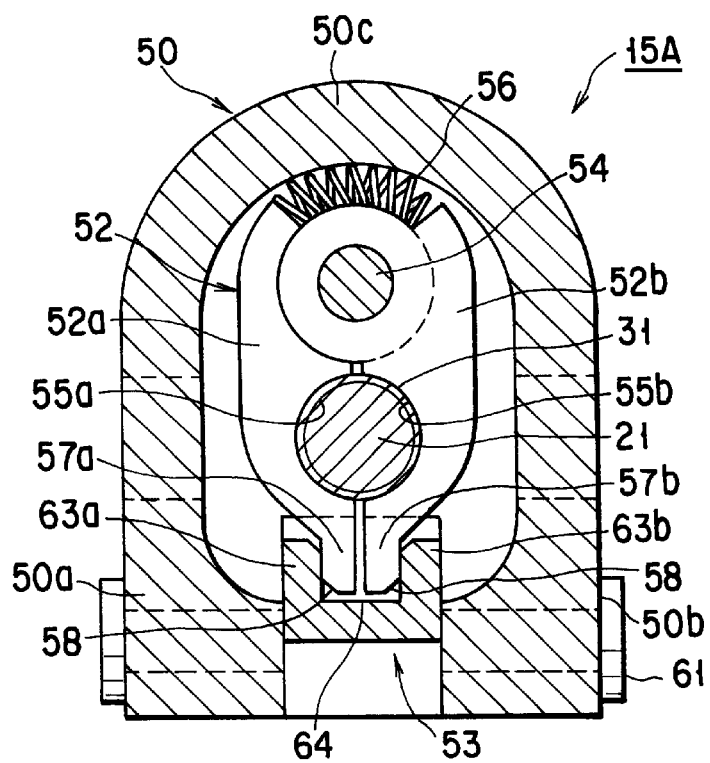
FIG. 9 is a sectional view taken along line F9—F9 of FIG. 8.

As shown in FIG. 9, the housing 50 is composed of a pair of side wall portions 50a and 50b, left and right, and a portion 50c connecting the wall portions 50a and 50b. The housing 50 contains a locking member 52 and a cam member 53 therein. The locking member 52 is composed of a pair of split nut pieces 52a and 52b, left and right. The nut pieces 52a and 52b are supported on a pivot 54 on the housing 50 so as to be rockable toward or away from each other.

Thread ridges 55a and 55b as typical projections are formed individually on the respective opposite inner surfaces of the split nut pieces 52a and 52b. The pitches and flank angle of the thread ridges 55a and 55b correspond to those of a thread groove 31 of the shaft 21, individually. The nut pieces 52a and 52b rock around the pivot 54. They can reciprocate between a lock position (shown in FIGS. 8 and 9) in which the thread ridges 55a and 55b engage the thread groove 31 of the shaft 21 and an unlock position (shown in FIGS. 10 and 11) in which the thread ridges 55a and 55b are disengaged from the thread groove 31. The split nut pieces 52a and 52b are urged in their closing direction, that is, toward the lock position, by means of a spring 56 for use as urging means.

Protuberances 57a and 57b are arranged on the lower parts of the split nut pieces 52a and 52b, respectively. An insertion guide face 58 tapered toward its lower end is formed on a side face of each of the protuberances 57a and 57b. Behind each of the protuberances 57a and 57b, a wedging guide face 59 is formed having a gap spread toward the rear end face of each protuberance.

The cam member 53 is rockable around a pivot 61 that is supported on the housing 50. It can reciprocate between a first position (shown in FIGS. 8 and 9) in which it keeps the split nut pieces 52a and 52b in the lock position and a second position (shown in FIGS. 10 and 11) in which it allows the nut pieces 52a and 52b to move to the unlock position.

The pivot 61 extends at right angles to the shaft 21. An operating member 62 for rocking the cam member 53 to the second position is provided on an end portion of the pivot 61. The member 62 may be a manually-operated lever or a power transmission member, such as a cable or rod.

Figure 7:
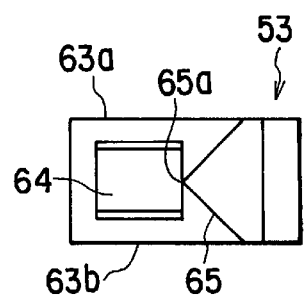
FIG. 7 is a plan view of a cam member of the reclining device shown in FIG. 6.

As shown in FIG. 7 and other drawings, the cam member 53 is provided with a pair of frame portions 63a and 63b. An aperture 64 in which the respective protuberances 57a and 57b of the locking member 52 can be inserted is formed between the frame portions 63a and 63b. A wedge portion 65 is provided behind the aperture 64. A distal end 65a of the wedge portion 65 faces the respective wedging guide faces 59 of the split nut pieces 52a and 52b. A spring 66 urges the cam member 53 in the direction indicated by arrow B in FIG. 8, that is, toward the first position in which the protuberances 57a and 57b of the nut pieces 52a and 52b are fitted in the aperture 64.

The following is a description of the operation of the reclining device 15A (FIGS. 6 to 11) constructed in this manner.

When the operating member 62 is not actuated, the cam member 53 is situated in the first position shown in FIGS. 8 and 9 by means of the elastic force of the spring 66, and the split nut pieces 52a and 52b of the locking member 52 are closed by means of the spring 56. In this lock position, the respective protuberances 57a and 57b of the split nut pieces 52a and 52b are fitted in the aperture 64 of the cam member 53, so that nut pieces 52a and 52b are prevented from separating. Since the thread ridges 55a and 55b of the nut pieces 52a and 52b are in engagement with the thread groove 31 of the shaft 21, moreover, the shaft 21 is fixed to the housing 50, so that the seat back is fixed.

Figure 10:
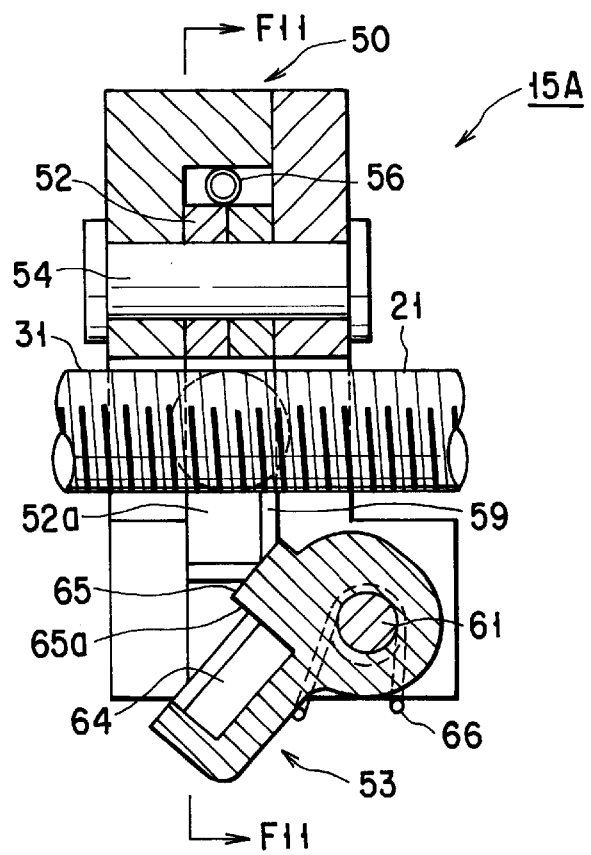
FIG. 10 is a vertical sectional view of the reclining device of FIG. 6 in an unlock state.
Figure 11:
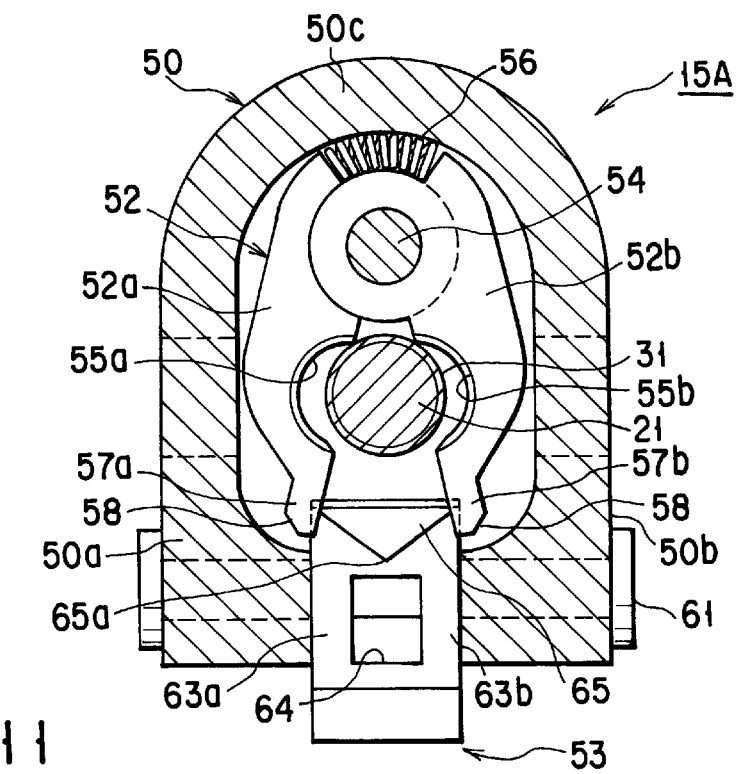
FIG. 11 is a sectional view taken along line F11—F11 of FIG. 10.

When the cam member 53 is rocked to the second position shown in FIGS. 10 and 11 by means of the operating member 62 or the like, the respective protuberances 57a and 57b of the split nut pieces 52a and 52b are disengaged from the aperture 64 of the cam member 53 in the middle of the rocking motion. Accordingly, the wedge portion 65 of the cam member 53 is inserted into the gap between the respective wedging guide faces 59 of the nut pieces 52a and 52b, whereupon the nut pieces 52a and 52b are separated.

Thus, the device is unlocked as the thread ridges 55a and 55b of the split nut pieces 52a and 52b are disengaged from the thread groove 31 of the shaft 21. When the device is unlocked in this manner, the shaft 21 is allowed to move in its axial direction with respect to the housing 50, so that the angle of the seat back can be adjusted.

If the operating force on the operating member 62 is removed after the angle of the seat back is adjusted, the cam member 53 is restored to the first position shown in FIG. 8 and other drawings by means of the elastic force of the spring 66. As this is done, the split nut pieces 52a and 52b are closed by the spring 56. In consequence, the respective protuberances 57a and 57b of the nut pieces 52a and 52b enter the aperture 64 of the cam member 53.

Accordingly, the split nut pieces 52a and 52b are restricted to the lock position, and the thread ridges 55a and 55b of the nut pieces 52a and 52b are kept in engagement with the thread groove 31 of the shaft 21. Thus, the seat back is fixed at a desired reclining angle. According to this embodiment, the frame portions 63a and 63b of the cam member 53 can restrain the locking member 52 from moving to be disengaged, depending on the flank angle of the thread ridges 55a and 55b, when an axial force acts on the shaft 21.

A third embodiment of the present invention will now be described with reference to FIGS. 12 to 17.

A reclining device 15B according to this embodiment comprises a housing 70, a shaft 21 constructed in the same manner as the one according to the first embodiment, etc. An end portion 21a of the shaft 21, like the one according to the first embodiment shown in FIG. 2, is connected to the lower part of the bracket 13b of the seat back 12 by means of a bolt or the like. The housing 70 is fixed to the frame of the seat cushion. The housing 70 is formed having holes 71 through which the shaft 21 is passed.

The housing 70 contains a locking member 72 and a cam member 73 therein. The locking member 72 is formed having thread ridges 74 that serve as typical projections. The pitches and flank angle of the thread ridges 74 correspond to those of a thread groove 31 of the shaft 21, individually. Shanks 75 are provided individually on the opposite sides of the locking member 72. The shanks 75, which extend at right angles to the shaft 21, are rotatably supported by means of their corresponding bearing portions 76 that are provided individually on the opposite sides of the housing 70.

Figure 12:
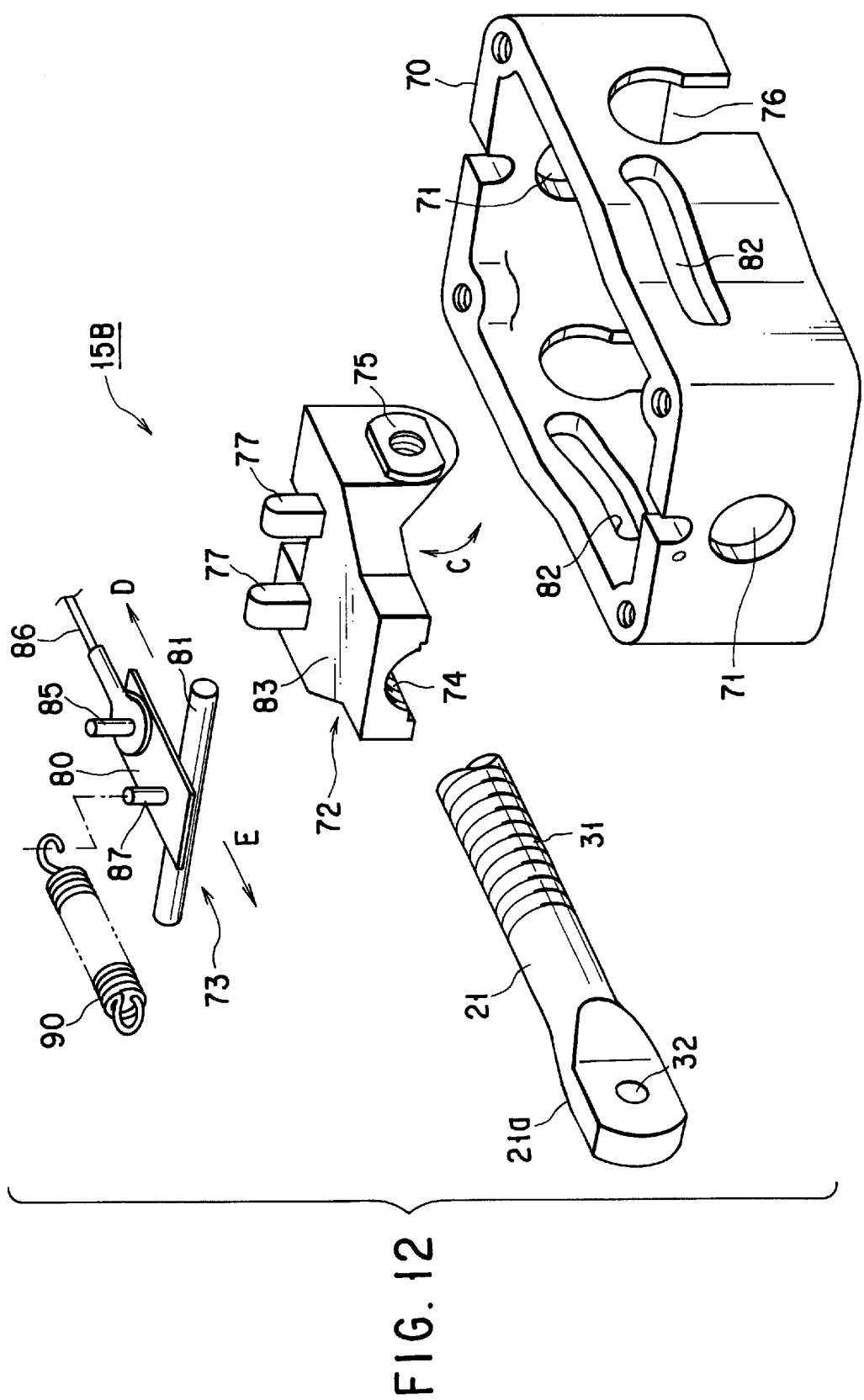
FIG. 12 is an exploded perspective view showing a part of a reclining device according to a third embodiment of the invention.

The locking member 72 is rockable in the direction indicated by arrow C in FIG. 12 (or in the diametrical direction of the shaft 21). It can move between a lock position (shown in FIG. 13) in which the thread ridges 74 engage the thread groove 31 of the shaft 21 and an unlock position (shown in FIG. 17) in which the thread ridges 74 are disengaged from the thread groove 31. A pair of engaging portions 77, left and right, are formed on the top surface of the locking member 72.

The cam member 73 is provided with a pin-shaped cam body 81 that is attached to a base 80. The cam body 81 extends at right angles to the shaft 21. The opposite end portions of the cam body 81 are inserted individually into longitudinal guide slits 82 that are formed individually in the opposite side wells of the housing 70. Thus, the cam member 73 is movable in the axial direction of the shaft 21 along the guide slits 82. The cam body 81 is situated in front of the engaging portions 77 on a cam receiving face 83 that is formed on the top surface of the locking member 72.

The cam member 73 can reciprocate between a first position (shown in FIG. 13) in which it keeps the locking member 72 in the lock position and a second position (shown in FIG. 17) in which it moves the locking member 72 to the unlock position.

A connecting portion 85 on the cam member 73 is provided with an operating member 86 for moving the member 73 to the second position. The operating member 86 may be a power transmission member, such as a cable or rod as illustrated, or a member with which the cam member 73 can be operated directly by hand. In short, the operating member 86 is expected to be able to move the cam member 73 in the direction of arrow D in FIG. 12. A tension spring 90 for use as urging means is stretched under initial tension between a spring peg portion 87 on the cam member 73 and a spring anchor portion 88 of the housing 70. The spring 90 continually urges the cam member 73 in the direction indicated by arrow E, that is, toward the first position.

The following is a description of the operation of the reclining device 15B (FIGS. 12 to 17) constructed in this manner.

When the operating member 86 is not actuated, the cam member 73 is held in the lock position shown in FIG. 13 by means of the elastic force of the spring 90. In this lock position, the cam body 81 presses the cam receiving face 83 of the locking member 72 toward the shaft 21. Since the thread ridges 74 of the locking member 72 engage the thread groove 31 of the shaft 21, moreover, the shaft 21 is fixed to housing 70, so that the seat back is fixed.

Figure 17:
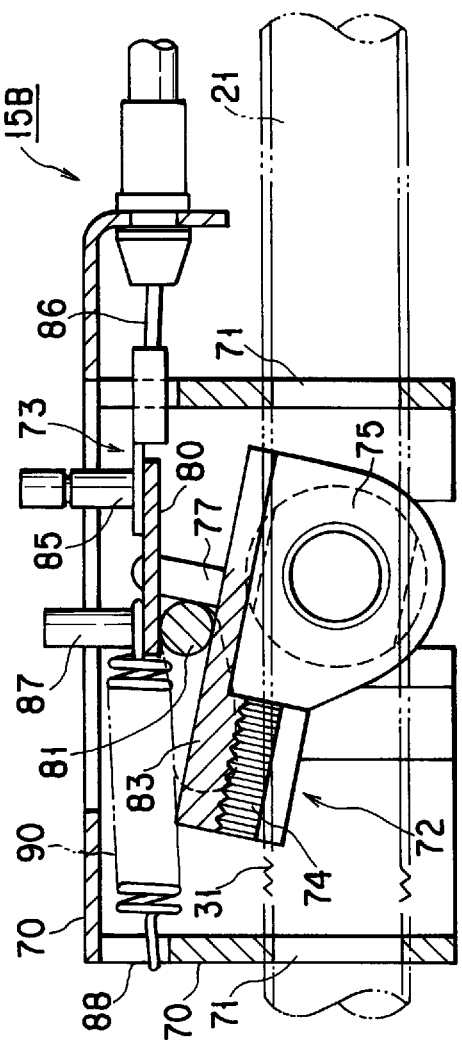
FIG. 17 is a sectional view of the reclining device of FIG. 12 in an unlock state.

When the cam member 73 is moved to the second position shown in FIG. 17 by means of the operating member 86, the cam body 81 abuts against the engaging portions 77, whereupon the locking member 72 rocks to the unlock position. In consequence, the thread ridges 74 of the locking member 72 is disengaged from the thread groove 31 of the shaft 21 to unlock the device, so that the angle of the seat back can be adjusted.

If the operating force on the operating member 86 is removed after the angle of the seat back is adjusted, the cam member 73 is restored to the first position shown in FIG. 13 by means of the elastic force of the spring 90. As the thread ridges 74 of the locking member 72 engage the thread groove 31 of the shaft 21, the device is locked, so that the seat back is fixed at a desired reclining angle. According to this embodiment, the cam body 81 of the cam member 73 can restrain the locking member 72 from moving to be disengaged, depending on the flank angle of the thread groove 31 and the thread ridges 74, when an axial force acts on the shaft 21.

According to the embodiments described above, the housings 20, 50 and 70 are fixed to the seal cushion, and the end portion 21a of the shaft 21 to the seat back. According to the invention, however, the housing and the shaft end portion may alternatively be connected to the seat back and the seat cushion, respectively, with the same result.

Further, the recess in the shaft 21 is not limited to the thread groove described in connection with the foregoing embodiments, and may alternatively be formed of a plurality of annular grooves that are arranged independently in the axial direction of the shaft. Thus, the projections on the locking member are not limited to the thread ridges described in connection with the foregoing embodiments, and may alternatively be a plurality of ring-shaped ridges that extend in the circumferential directions and are arranged at pitches corresponding to the projections in the axial direction of the shaft. It is to be understood that the elements that constitute the present invention, such as the shaft, housing, locking member, cam member, operating member, and urging means, may be suitably modified in carrying out the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A seat reclining device comprising:
   a housing adapted to be fixed to one of a seat cushion and a seat back of a seat;

a shaft adapted to be connected to the one of the seat back and the seat cushion, said shaft having a plurality of recesses extending in a circumferential direction thereof and arranged in an axial direction thereof;

a locking member having projections capable of individually engaging the recesses of the shaft, said locking member being movable between a lock position in which the projections engage the recesses and an unlock position in which the projections are disengaged from the recesses;

a cam member capable of reciprocating between a first position in which the cam member keeps the locking member in the lock position and a second position in which the cam member moves the locking member toward the unlock position;

urging means for urging the locking member toward the lock position; and an operating member capable of moving the cam member to the second position;

wherein said cam member is rockable around a pivot on the housing, and said locking member has a cam receiving face adapted to come into contact with the cam member to hold the locking member in the lock position when the cam member is rocked to the first position, and an engaging portion adapted to come into contact with the cam member to move the locking member to the unlock position when the cam member is rocked to the second position.

2. The reclining device according to claim 1, wherein said recesses of said shaft comprise a helical thread groove in an outer peripheral surface of the shaft, and said projections of said locking member comprise thread ridges arranged at pitches corresponding to the helical thread groove.

3. A seat reclining device comprising:

a housing adapted to be fixed to one of a seat cushion and a seat back of a seat;

a shaft adapted to be connected to the one of the seat back and the seat cushion, said shaft having a plurality of recesses extending in a circumferential direction thereof and arranged in an axial direction thereof;

a locking member having projections capable of individually engaging the recesses of the shaft, said locking member being movable between a lock position in which the projections engage the recesses and an unlock position in which the projections are disengaged from the recesses;

a cam member capable of reciprocating between a first position in which the cam member keeps the locking member in the lock position and a second position in which the cam member moves the locking member toward the unlock position;

urging means for urging the locking member toward the lock position; and an operating member capable of moving the cam member to the second position;

wherein said locking member comprises a pair of split nut pieces that are situated on either side of the shaft and that are rockable toward or away from each other, and said cam member is rockable around a pivot on the housing and includes frame portions adapted to restrict the split nut pieces so as to prevent the nut pieces from being separated from each other when closed, and a wedge portion adapted to wedge into a gap between the nut pieces to separate the nut pieces when the cam member is rocked from the first position to the second position.

4. The reclining device according to claim 3, wherein said recesses of said shaft comprise a helical thread groove in an outer peripheral surface of the shaft, and said projections of said locking member comprise thread ridges arranged at pitches corresponding to the helical thread groove.

5. A seat reclining device comprising:

a housing adapted to be fixed to one of a seat cushion and a seat back of a seat;

a shaft adapted to be connected to the one of the seat back and the seat cushion, said shaft having a plurality of recesses extending in a circumferential direction thereof and arranged in an axial direction thereof;

a locking member having projections capable of individually engaging the recesses of the shaft, said locking member being movable between a lock position in which the projections engage the recesses and an unlock position in which the projections are disengaged from the recesses;

a cam member capable of reciprocating between a first position in which the cam member keeps the locking member in the lock position and a second position in which the cam member moves the locking member toward the unlock position;

urging means for urging the locking member toward the lock position; and an operating member capable of moving the cam member to the second position;

wherein said cam member can reciprocate in the axial direction of the shaft with respect to the housing, and said locking member is movable in a diametrical direction of the shaft and includes a cam receiving face adapted to be pressed by the cam member to hold the locking member in the lock position when the cam member is in the first position, and an engaging portion adapted to come into contact with the cam member to move the locking member to the unlock position when the cam member is moved to the second position.

6. The reclining device according to claim 5, wherein said recesses of said shaft comprise a helical thread groove in an outer peripheral surface of the shaft, and said projections of said locking member comprise thread ridges arranged at pitches corresponding to the helical thread groove.

* * * * *